United States Patent
Fudaba (10) Patent No.: US 9,380,509 B2
(45) Date of Patent: Jun. 28, 2016

(54) BASE STATION AND BASE STATION CONTROL METHOD

(71) Applicant: FUJITSU LIMITED, Kawasaki-shi, Kanagawa (JP)

(72) Inventor: Nobukazu Fudaba, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/572,955

(22) Filed: Dec. 17, 2014

(65) Prior Publication Data

US 2015/0208312 A1 Jul. 23, 2015

(30) Foreign Application Priority Data

Jan. 23, 2014 (JP) ................................ 2014-010097

(51) Int. Cl.
| | |
|---|---|
| H04W 36/30 | (2009.01) |
| H04W 36/00 | (2009.01) |
| H04W 52/38 | (2009.01) |
| H04W 52/24 | (2009.01) |
| H04B 17/327 | (2015.01) |

(52) U.S. Cl.
CPC ............ *H04W 36/30* (2013.01); *H04B 17/327* (2015.01); *H04W 36/0083* (2013.01); *H04W 52/244* (2013.01); *H04W 52/386* (2013.01)

(58) Field of Classification Search
CPC ..... H04W 24/10; H04W 36/30; H04W 88/04; H04W 72/0406; H04W 72/082; H04W 84/18; H04W 24/02; H04W 16/18; H04L 41/0823
USPC ......................... 455/437, 440, 422.1; 370/252
See application file for complete search history.

(56) References Cited

U.S. PATENT DOCUMENTS

| | | | | |
|---|---|---|---|---|
| 2011/0105109 | A1* | 5/2011 | Uemura | H04W 4/22 455/422.1 |
| 2012/0115541 | A1 | 5/2012 | Suga | |
| 2012/0142357 | A1* | 6/2012 | Aminaka | H04W 36/0055 455/437 |
| 2013/0225180 | A1* | 8/2013 | Lim | H04W 36/32 455/440 |

FOREIGN PATENT DOCUMENTS

| | | |
|---|---|---|
| JP | 2010-219970 | 9/2010 |
| JP | 2011-035763 | 2/2011 |
| JP | 2012-100220 | 5/2012 |
| JP | 2012-175646 | 9/2012 |

OTHER PUBLICATIONS

Takaharu Kobayashi, et al.; "A Study of Downlink Transmission Power Control in Femtocell Networks". (2011) The Institute of Electronics, Information and Communication Engineers (IEICE) Communications Society Conference. p. 430 ( 6 pages including English Translation).

* cited by examiner

*Primary Examiner* — Phuoc H Doan
(74) *Attorney, Agent, or Firm* — Fujitsu Patent Center (57) ABSTRACT

A base station includes an acquiring unit, a deciding unit, and a control unit. The acquiring unit acquires measurement information related to wireless communication quality of a mobile station. The deciding unit decides, by using the measurement information acquired by the acquiring unit and information that is used to control priority of a handover destination cell indicated by a control station, a cell to which the mobile station is handed over. The control unit hands over the mobile station to the cell decided by the deciding unit.

5 Claims, 6 Drawing Sheets

BASE STATION AND BASE STATION CONTROL METHOD

CROSS-REFERENCE TO RELATED APPLICATION

This application is based upon and claims the benefit of priority of the prior Japanese Patent Application No. 2014-010097, filed on Jan. 23, 2014, the entire contents of which are incorporated herein by reference.

FIELD

The embodiments discussed herein are related to a base station and a base station control method.

BACKGROUND

In a related mobile communication system, when a plurality of base stations is arranged, the reception level of a mobile station may sometimes be decreased around the boundary of a cell that is formed by each of the base stations. Furthermore, in an area that includes a plurality of base stations, if mobile stations are distributed in an unbalanced manner, user load is concentrated on a specific base station; therefore, the throughput of the mobile stations connected to the base station may sometimes be decreased. Such a decrease in the reception level or the throughput causes a decrease in the communication quality of, for example, the mobile station located near the edge of the cell.

As a countermeasure against the problem described above, there is a method that improves the communication quality described above by arranging a centralized control station that controls the plurality of base stations in the mobile communication system and by optimizing, performed by the centralized control station in accordance with the distribution of the mobile stations, the transmission power of each of the base stations and association of each of the mobile stations with the base stations to which the mobile stations are connected. With this method, first, the centralized control station collects measurement information, for example, reference signal received power (RSRP), from the mobile stations connected to the base station that manages the mobile station and calculates, based on the measurement information, a path loss between a base station and a mobile station. Then, the centralized control station obtains a transmission power value indicating that the index value, such as the communication quality at the edge of a cell or the like, is the maximum; obtains the mobile station serving as the counterpart of the connection; and then notifies the obtained results to each of the base stations. Then, in accordance with the notification, each of the base stations changes its own transmission power and changes, as needed, association of a mobile station to other base station, which corresponds to a handover (HO) process.

There are two types of handover as follows. A first handover is a handover starting from a mobile station (hereinafter, referred to as a "normal handover"). With the normal handover, if a predetermined trigger condition is satisfied by a decrease in the reception level from its serving base station or the like, a mobile station reports the measurement information described above to the base station. The base station decides a target base station for handover based on the reported measurement information and then hands over the mobile station to the target base station.

In contrast, a second handover is a handover starting from a base station (hereinafter, referred to as a "forced handover"). With the forced handover, the base station forcedly hands over a mobile station to the base station that is indicated by the centralized control station regardless of whether the predetermined trigger condition is satisfied.

Patent Document 1: Japanese Laid-open Patent Publication No. 2012-100220

Patent Document 2: Japanese Laid-open Patent Publication No. 2011-35763

Non-Patent Document 1: Kobayashi Takaharu, Kimura Dai, Seki Hiroyuki, "A study of Downlink Transmission Power Control in Femtocell Networks", *the Institute of Electronics, Information and Communication Engineers (IEICE) Society Conference*, Fujitsu laboratories Ltd., p. 430, Sep. 13 to 16, 2011

However, there are the following problems with the above described handovers.

Figure 8:
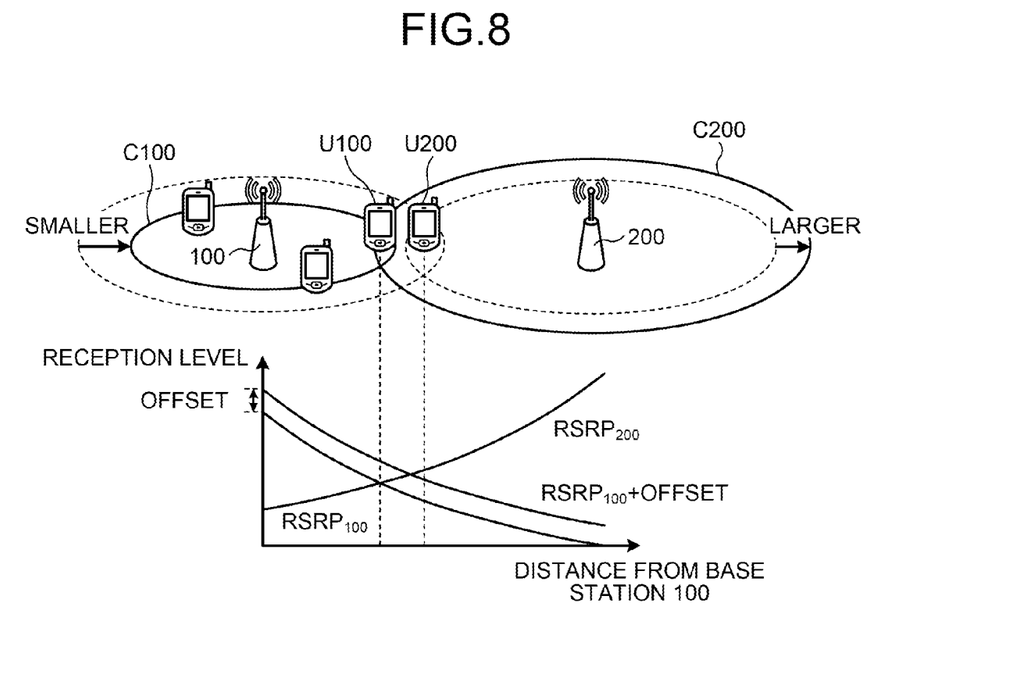
FIG. 8 is a schematic diagram illustrating a problem of a normal handover performed in a related technology.

First, with the normal handover, a mobile station does not perform a handover process unless the predetermined trigger condition is satisfied. Consequently, there may be a case in which the accuracy of the optimization is decreased and thus the communication quality may sometimes be decreased. In the following, a description will be given in detail below with reference to FIG. 8. FIG. 8 is a schematic diagram illustrating a problem of a normal handover performed in a related technology. In FIG. 8, it is assumed of a case in which, in order to optimize the state, the centralized control station reduces the transmission power of a handover source base station 100 and increases the transmission power of a handover destination base station 200. Consequently, a cell C100 formed by the base station 100 becomes smaller and a cell C200 formed by the base station 200 becomes larger; therefore, from among the four mobile stations connected to the base station 100, a mobile station U200 located at the edge of the cell is connected to, i.e., handed over to, the base station 200.

However, if optimization is performed under the assumption that a mobile station connects to the base station from which received power is the maximum, when the difference between the reception levels received by like the mobile station U100 from the base stations 100 and 200 is very small ($RSRP_{200} < RSRP_{100}$), a predetermined trigger condition, such as $RSRP_{200} > RSRP_{100}$+an offset value, is not satisfied. Consequently, even though the mobile station U100 is located at the edge of each of the cells C100 and C200, the mobile station U100 is not connected to the base station 200 that is the handover destination indicated by the centralized control station. Namely, the mobile station U100 remains in the base station 100 even though the mobile station U100 is preferably handed over to the base station 200 under normal circumstances in terms of load distribution. However, if optimization is performed by taking into consideration the trigger condition, a handover is performed only when the difference of the reception levels between the base stations 100 and 200 is equal to or greater than an offset value, which decreases the resolution of the control. This is a cause of a decrease in the accuracy of the optimization of the normal handover and, furthermore, a cause of a decrease in the communication quality.

Figure 9:
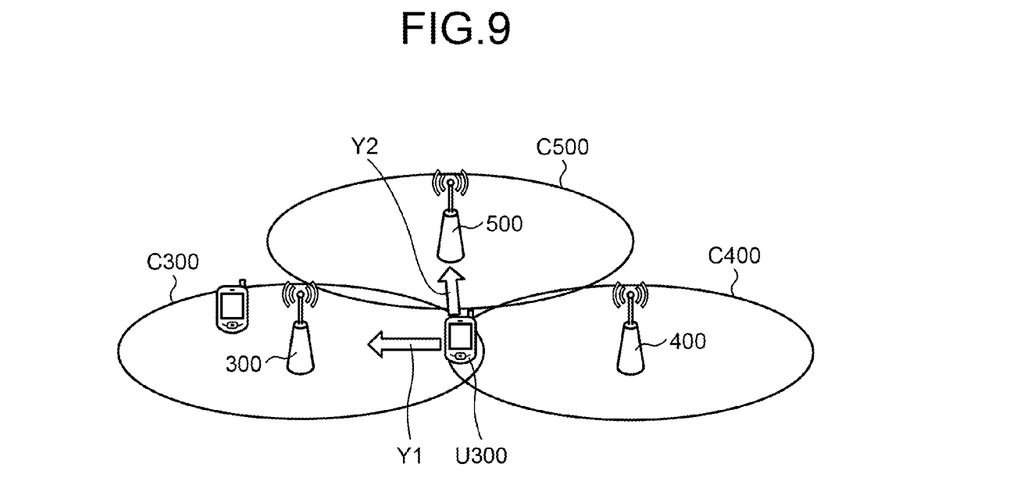
FIG. 9 is a schematic diagram illustrating a problem of a forced handover performed in the related technology.

In contrast, with the forced handover, a base station forcedly performs the handover process regardless of a change in the communication status due to movement of a mobile station. Consequently, even if a handover to a base station indicated by the centralized control station is not appropriate any more, the handover is performed and thus the communication quality may sometimes be decreased. In the following, a description will be given in detail below with reference to FIG. 9. FIG. 9 is a schematic diagram illustrating a problem of a forced handover performed in the related technology. In FIG. 9, it is assumed of a case in which the centralized control station collects measurement information from a mobile station U300 that is connected to a base station 300 and the mobile station U300 moves by the time at which the centralized control station indicates the base station functioning as the handover destination to the base stations 300, 400, and 500.

With the forced handover, the mobile station U300 is handed over to, for example, a base station 400 that forms a cell C400 regardless of the communication status at the time of the execution of the handover. However, if the mobile station U300 moves in the direction indicated by an arrow Y1 or Y2, the reception level of the cells C300 and C500 becomes higher than the reception level of the cell C400. Consequently, the mobile station U300 is handed over to the base station 400 that forms the cell C400 in which the reception level that is lower than that previously used and, on the contrary, the communication quality is decreased.

Furthermore, with the normal handover, it is possible to perform a handover that takes into consideration the communication status at the time of the execution of the handover; however, as described above, a mobile station does not perform the handover process unless the above described predetermined trigger condition is satisfied.

As described above, with the normal handover and the forced handover, there may be a case in which a mobile station is not handed over to an appropriate base station or is handed over to an inappropriate base station. Consequently, the quality of the communication between the base station and the mobile station may possibly be decreased.

SUMMARY

According to an aspect of the embodiments, a base station includes an acquiring unit, a deciding unit, and a control unit. The acquiring unit acquires measurement information related to wireless communication quality of a mobile station. The deciding unit decides, by using the measurement information acquired by the acquiring unit and information that is used to control priority of a handover destination cell indicated by a control station, a cell to which the mobile station is handed over. The control unit hands over the mobile station to the cell decided by the deciding unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The base station and the base station control method disclosed in this invention are not limited to the embodiment described below.

Figure 1:
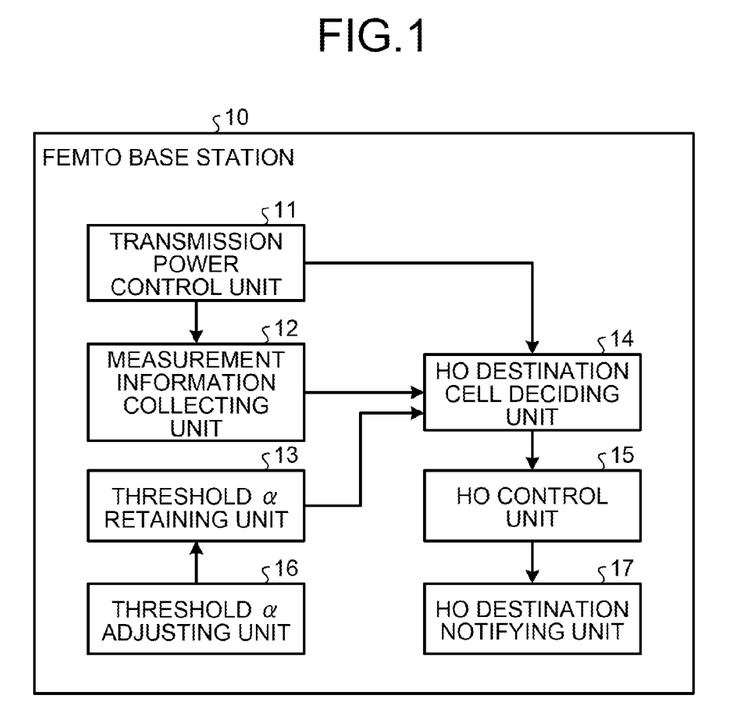
FIG. 1 is a schematic diagram illustrating the functional configuration of a femto base station.

First, the configuration of a femto base station according to an embodiment disclosed in the present invention will be described. FIG. 1 is a schematic diagram illustrating the functional configuration of a femto base station. As illustrated in FIG. 1, a femto base station 10 includes a transmission power control unit 11, a measurement information collecting unit 12, a threshold $\alpha$ retaining unit 13, an HO destination cell deciding unit 14, an HO control unit 15, a threshold $\alpha$ adjusting unit 16, and an HO destination notifying unit 17. Each of these units is connected such that a signal or data can be input and output in a one-way or two-way direction.

The transmission power control unit 11 changes the transmission power of the femto base station 10 to an optimum value that is received as a notification from a centralized control station. Furthermore, in accordance with whether the number of handovers to a cell other than the cell that is indicated as the HO destination is equal to or greater than a predetermined value, the transmission power control unit 11 controls the transmission power of the femto base station 10 such that the transmission power is fixed or varied.

The measurement information collecting unit 12 collects, from each mobile station, measurement information including, for example, RSRP or the like measured by each mobile station connected to the femto base station 10. For example, the measurement information collecting unit 12 acquires, from the HO target mobile station, the measurement information related to the handover source cell that accommodates the handover (HO) target mobile station, the measurement information related to the indicated handover destination cell, and the measurement information related to the cell in which the wireless communication quality is the most favorable from among the cells other than these previously mentioned two cells, i.e., the handover source cell and the handover destination cell. The HO target mobile station mentioned here is a mobile station that is targeted for the decision performed by the HO destination cell deciding unit 14, i.e., a mobile station that is targeted for deciding a cell formed by a handover destination base station (hereinafter, simply referred to as a "handover destination cell").

The threshold $\alpha$ retaining unit 13 retains therein a threshold $\alpha$ that is used to control the priority of the cell specified as the handover destination by the centralized control station. The threshold $\alpha$ will be described in detail later. The HO destination cell deciding unit 14 decides a handover destination cell for the HO target mobile station by using the measurement information described above acquired by the measurement information collecting unit 12 and by using the threshold $\alpha$ retained in the threshold $\alpha$ retaining unit 13. The HO control unit 15 controls, based on the determination result obtained by the HO destination cell deciding unit 14, a handover in which an HO target mobile station is handed over to a handover destination cell.

The threshold α adjusting unit 16 appropriately changes the threshold α in accordance with the mobility, such as a moving speed, the number of times the terminals move (frequency), or the like, of the HO target mobile station. For example, the threshold α adjusting unit 16 decreases the threshold α as the average mobility of the mobile station connected to the femto base station 10 is increased. After the handover of the HO target mobile station performed by the HO control unit 15, the HO destination notifying unit 17 notifies the centralized control station of the cell to which the HO target mobile station was actually handed over.

Figure 2:
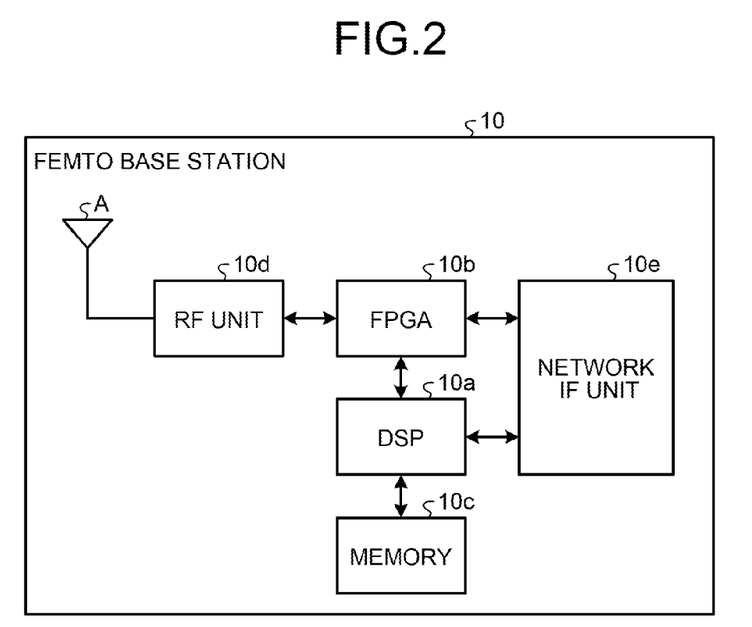
FIG. 2 is a schematic diagram illustrating the hardware configuration of the femto base station.

FIG. 2 is a schematic diagram illustrating the hardware configuration of the femto base station. As illustrated in FIG. 2, the femto base station 10 includes, as hardware components, a digital signal processor (DSP) 10a, a field programmable gate array (FPGA) 10b, a memory 10c, a radio frequency (RF) unit 10d, and an network interface (IF) unit 10e. The DSP 10a and the FPGA 10b are connected, via the network IF unit 10e, such as a switch or the like, such that various kinds of signals or data can be input or output. The RF unit 10d includes an antenna A. The memory 10c is constituted by a RAM, such as a synchronous dynamic random access memory (SDRAM) or the like, a read only memory (ROM), or flash memory.

Furthermore, regarding the association relationship between the functional configuration and the hardware configuration, the transmission power control unit 11, the measurement information collecting unit 12, the HO destination cell deciding unit 14, the HO control unit 15, and the threshold α adjusting unit 16 are implemented by, for example, an integrated circuit, such as the DSP 10a, the FPGA 10b, or the like. The threshold α retaining unit 13 is implemented by, for example, the memory 10c. The HO destination notifying unit 17 is implemented by, for example, the RF unit 10d.

In the following, an operation will be described.

Figure 3:
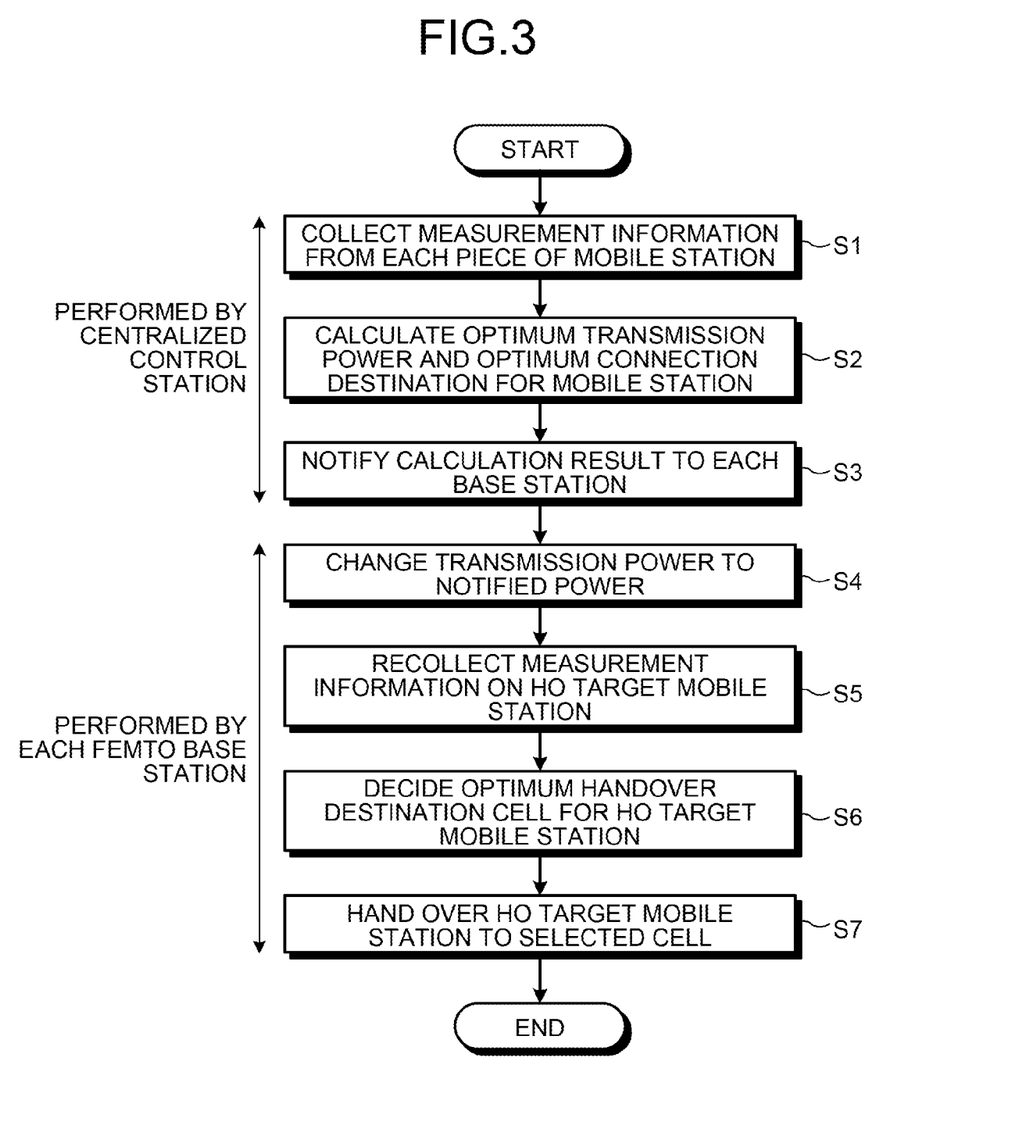
FIG. 3 is a flowchart illustrating the flow of a cell boundary control process.

FIG. 3 is a flowchart illustrating the flow of a cell boundary control process. First, at Step S1, the centralized control station collects the measurement information from the mobile stations connected to each of the femto base stations that are managed by the centralized control station. At Step S2, by using the measurement information collected at Step S1, the centralized control station calculates an optimum value of transmission power of each of the femto base stations and decides a femto base station that is optimum connection destination for each mobile station. At Step S3, the centralized control station notifies each of the femto base stations managed by the centralized control station itself of the calculated transmission power value and the femto base station that is the destination for the connection.

In the following, an operation of the femto base station 10 will be described by using, as an example, the femto base station 10 from among the plurality of the femto base stations that receives the notification. First, at Step S4, the transmission power control unit 11 in the femto base station 10 that receives the notification changes its own transmission power to the optimum value that is notified by the centralized control station. Then, the measurement information collecting unit 12 in the femto base station 10 recollects, from the HO target mobile station accommodated in the cell C10 that is formed by the femto base station 10, the measurement information related to the mobile station in the downlink direction and checks the communication status (Step S5).

At Step S5 described above, a method of indicating a report about the measurement information made by the femto base station 10 to the HO target mobile station includes a method of, for example, alleviating the trigger condition of the report about the measurement information made by a mobile station. This method is implemented by the measurement information collecting unit 12 in the femto base station 10 temporarily changing various parameters, such as an offset value or a threshold, that are used to set the trigger condition only for the HO target mobile station. Specifically, for example, with the Long Term Evolution (LTE), in an event A1 that is one of the events at which measurement is started, a mobile station starts the measurement when RSRP from its serving cell becomes equal to or greater than a threshold. Consequently, the measurement information collecting unit 12 in the femto base station 10 temporarily sets the threshold to the minimum value, whereby the measurement information collecting unit 12 can acquire the measurement information from the HO target mobile station at an arbitrary timing. Alternatively, in a case of an event A3, by setting the offset value at the time of "an RSRP value received from an adjacent cell>an RSRP value from its serving cell+an offset value", which is the trigger condition, to the minimum value, the femto base station 10 can also acquire the measurement information from the HO target mobile station. Furthermore, in a case of an event A4, by setting the threshold at the time of "an RSRP value received from an adjacent cell>a threshold", which is the trigger condition, to the minimum value, the femto base station 10 can also acquire the measurement information from the HO target mobile station. The offset value described above is, for example, 3 dB.

At Step S6, the HO destination cell deciding unit 14 in the femto base station 10 decides a handover destination cell for the HO target mobile station based on the measurement information collected at Step S5 and based on the threshold α that is used to control the priority of the cell indicated as the handover destination by the centralized control station.

Figure 4:
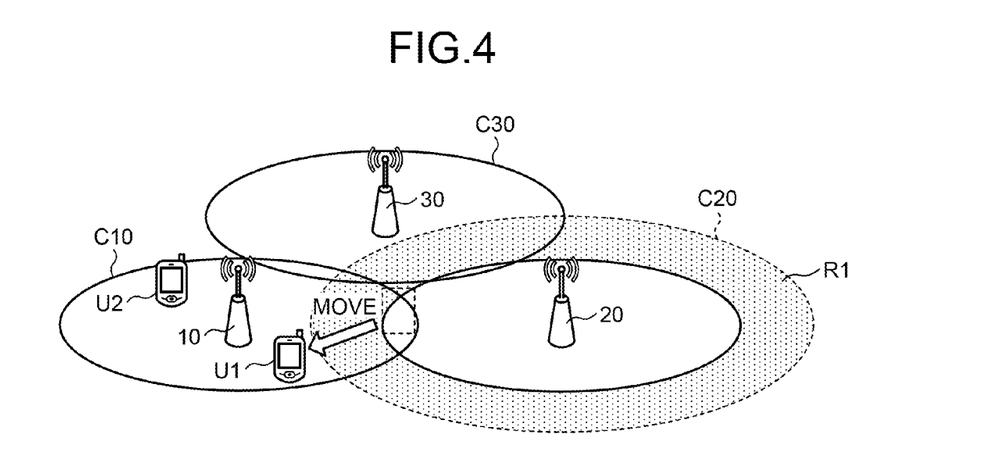
FIG. 4 is a schematic diagram illustrating a process, performed by the femto base station, of deciding a handover destination cell to which an HO target mobile station is handed over.

In the following, the cell deciding method used at Step S6 will be described below in detail with reference to FIG. 4. FIG. 4 is a schematic diagram illustrating a process, performed by the femto base station 10, of deciding a handover destination cell to which an HO target mobile station is handed over. In FIG. 4, the cell that is formed by the femto base station 10 to which a mobile station U1 is connected is referred to as an "HO source cell C10". Furthermore, the cell that is formed by the femto base station 20 that has the same configuration as that of the femto base station 10 and that is indicated as the handover destination by the centralized control station is referred to as an "HO destination indication cell C20". Furthermore, the cell that is formed by the femto base station 30 that has the same configuration as that of the femto base station 10 and that has the maximum RSRP value for the mobile station U1 from among the cells other than the cells C10 and C20 is referred to as the "other cell C30". Furthermore, a mobile station U2 has the same configuration as that of the mobile station U1.

At Step S6, the HO destination cell deciding unit 14 in the femto base station 10 adds the threshold α only to the $RSRP_{C20}$ received from the HO destination indication cell C20 and then compares the added value with the $RSRP_{C10}$ received from the HO source cell C10 and the $RSRP_{C30}$ received from the other cell C30. Specifically, if the condition of "$RSRP_{C10} > RSRP_{C20} + \alpha$", which is the condition (1), is satisfied, the HO destination cell deciding unit 14 determines that the mobile station U1 can be present in a cell in which the communication quality is good when a connection destination cell is selected based on the current communication status of the mobile station U1 instead of a connection destination cell being selected based on an instruction received from the centralized control station. Accordingly, if the condition (1) described above is satisfied, the HO destination cell deciding unit 14 selects, as the handover destination cell for the mobile station U1 that is the HO target mobile station, the "HO source cell C10" in which the RSRP is further high. Consequently, the mobile station U1 remains in the HO source cell C10 without being handed over.

Similarly, if the condition of "$RSRP_{C30} > RSRP_{C20} + \alpha$", which is the condition (2), is satisfied, the HO destination cell deciding unit 14 determines that the mobile station U1 can be present in a cell in which the communication quality is good when a connection destination cell is selected based on the current communication status of the mobile station U1 instead of a connection destination cell being selected based on an instruction received from the centralized control station. Accordingly, if the condition (2) is satisfied, the HO destination cell deciding unit 14 selects, as the handover destination cell for the mobile station U1 that is the HO target mobile station, "the other cell C30" in which the RSRP is further high. Consequently, the mobile station U1 is handed over from the HO source cell C10 to the other cell C30.

In contrast, if neither the conditions (1) nor (2) is satisfied, the HO destination cell deciding unit 14 determines that the mobile station U1 can be present in a cell in which the communication quality is good when a connection destination cell is selected in accordance with the instruction received from the centralized control station. Accordingly, no condition is satisfied, the HO destination cell deciding unit 14 selects the "HO destination indication cell C20" as the handover destination cell for the mobile station U1 that is the HO target mobile station. Consequently, the mobile station U1 is handed over from the HO source cell C10 to the HO destination indication cell C20.

For example, in the example illustrated in FIG. 4, the mobile station U1 moves outside an area R1 (a half-tone dot meshing portion) in which an instruction received from the centralized control station is prioritized based on the threshold $\alpha$. Accordingly, the HO destination cell deciding unit 14 in the femto base station 10 determines that a case, in which the mobile station U1 continues the connection to the femto base station 10 that corresponds to the previous HO source cell C10 without performing a handover, is effective from the viewpoint of the communication quality rather than a case in which the mobile station U1 is forcedly handed over to the HO destination indication cell C20.

A description will be given here by referring back to FIG. 3. At Step S7, the HO control unit 15 in the femto base station 10 hands over the HO target mobile station, for example, the mobile station U1 illustrated in FIG. 4, to the cell that is selected as the optimum handover destination at Step S6. This handover includes a case of a handover to the cell C10 itself that is the handover source (a case in which a handover is not performed).

The threshold $\alpha$ used here is a preset value that is set when, for example, a cell is designed before the operation of the femto base station 10 is started. The threshold $\alpha$ can be set to a value of, for example, 3 to 6 dB, that varies depending on the size of a cell that is formed by the femto base station 10, the average number of connected mobile stations, the mobility of the connected mobile stations, the distribution of the connected mobile stations, or the like. However, the threshold $\alpha$ does not always have to be a fixed value. Namely, the femto base station 10 may also appropriately adjust the threshold $\alpha$ in accordance with, for example, the mobility of the mobile station connected to the femto base station 10. For example, as the average mobility of the mobile station connected to the femto base station 10 is increased, the threshold $\alpha$ adjusting unit 16 in the femto base station 10 may also reduce the threshold $\alpha$ and suppress a handover to the HO destination indication cell C20 and, as the average mobility is decreased, the threshold $\alpha$ adjusting unit 16 may also increase the threshold $\alpha$ and may prompt a handover to the HO destination indication cell C20.

Furthermore, the threshold $\alpha$, the normal handover, and the forced handover have the relationship in which, if the threshold $\alpha$ is zero, the same operation as that of the normal handover described above is performed and, if the threshold $\alpha$ is $\infty$, the same operation as that of the forced handover described above is performed. Consequently, the femto base station 10 can perform an intermediate operation between the normal handover and the forced handover by appropriately adjusting the threshold $\alpha$.

Figure 5:
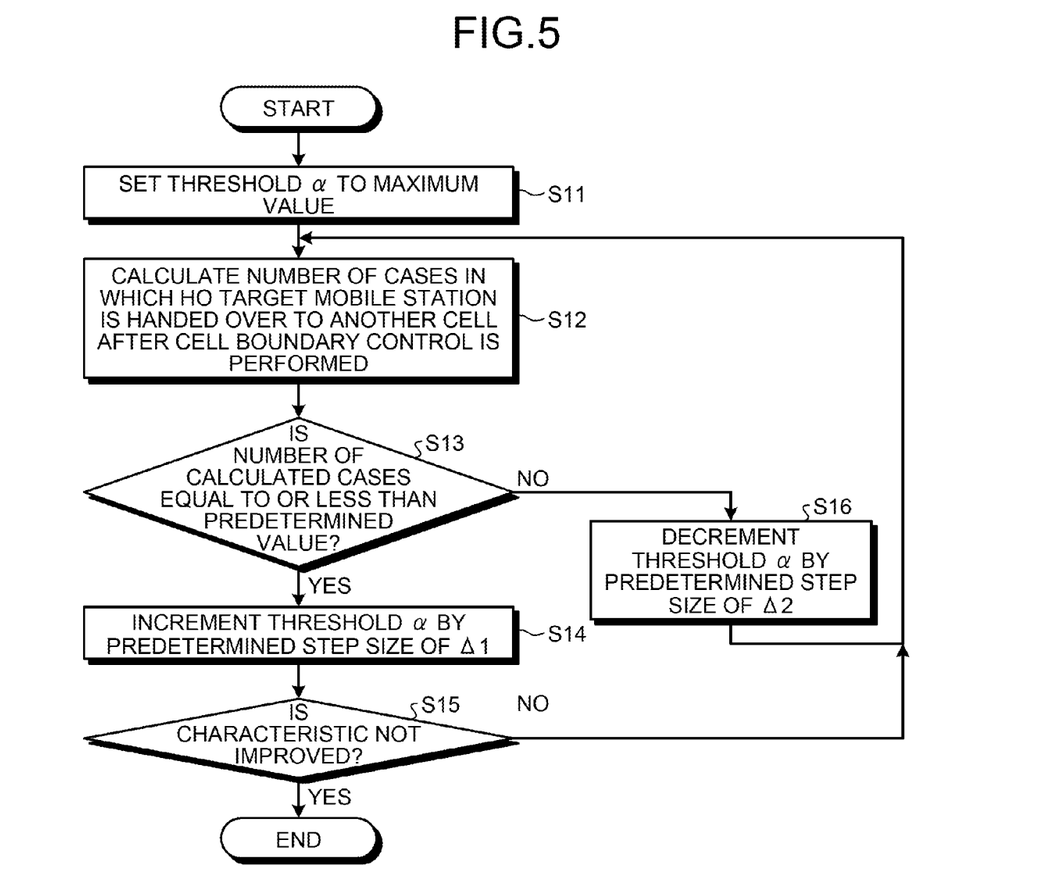
FIG. 5 is a flowchart illustrating the flow of a process, performed by the femto base station, of adjusting a threshold to an optimum value.

FIG. 5 is a flowchart illustrating the flow of a process, performed by the femto base station 10, of adjusting the threshold $\alpha$ to an optimum value. First, at Step S11, the threshold $\alpha$ adjusting unit 16 in the femto base station 10 sets the threshold $\alpha$ to the maximum value ($\infty$). Consequently, a cell boundary control process due to the forced handover is performed. Then, the threshold $\alpha$ adjusting unit 16 calculates the number of cases in which the mobile station U1 targeted for a handover is newly handed over to another cell after the cell boundary control process illustrated in FIG. 3 is performed (Step S12). The number of cases to be calculated is, for example, the number of cases per predetermined time, the number of cases (rate) per number of mobile stations, the number of cases per predetermined area, or the combination of these cases.

At Step S13, the threshold $\alpha$ adjusting unit 16 determines whether the number of cases calculated at Step S12 is equal to or less than the predetermined value. If the determination result indicates that the number of calculated cases is equal to or less than the predetermined value (Yes at Step S13), the threshold $\alpha$ adjusting unit 16 increments the threshold $\alpha$ by a predetermined step size of $\Delta 1$ (Step S14). At Step S15, if the result of the increment performed at Step S14 indicates that the characteristic is not improved (Yes at Step S15), the threshold $\alpha$ adjusting unit 16 ends the series of the process. In contrast, if the characteristic is improved (No at Step S15), the threshold $\alpha$ adjusting unit 16 returns to Step S12 and performs the process at Step S12 and the subsequent processes again.

The characteristic mentioned above is the index that indicates the accuracy of the optimization performed by the cell boundary control process. For example, if the value of the throughput or the communication quality is increased before or after the control process, the threshold $\alpha$ adjusting unit 16 determines that the characteristic has been improved.

If the result of the determination performed at Step S13 indicates that the number of calculated cases is greater than the predetermined value (No at Step S13), the threshold $\alpha$ adjusting unit 16 decrements the threshold $\alpha$ by a predetermined step size of $\Delta 2$ (Step S16). The step size $\Delta 2$ may also be the same value of the step size $\Delta 1$. After the process at Step S16 has been performed, the threshold $\alpha$ adjusting unit 16 returns to Step S12 and performs the process at Step S12 and the subsequent processes again.

In an environment in which the number of mobile stations to be moved is great, the number of the HO target mobile stations that are handed over to an inappropriate cell is increased due to the forced handover. These HO target mobile stations attempt to further hand over (modified handover) to the other cell in which the communication quality is better than that of the forced handover destination cell immediately after the cell boundary control process is performed. Accordingly, the femto base station 10 can estimate whether the threshold $\alpha$ is closer to the optimum value based on the number of cases of the handover. Namely, the femto base station 10 decrements the threshold α by the predetermined step size Δ2 such that the number of cases of the modified handovers is equal to or less than the predetermined value. However, if the threshold α is set to a too small value, the degree of the improvement of the characteristic by using the cell boundary control process is decreased. Consequently, in contrast, the femto base station 10 increments the threshold α by the predetermined step size of Δ1 until the characteristic is further improved. Thus, the threshold α is adjusted to an optimum value.

Figure 6:
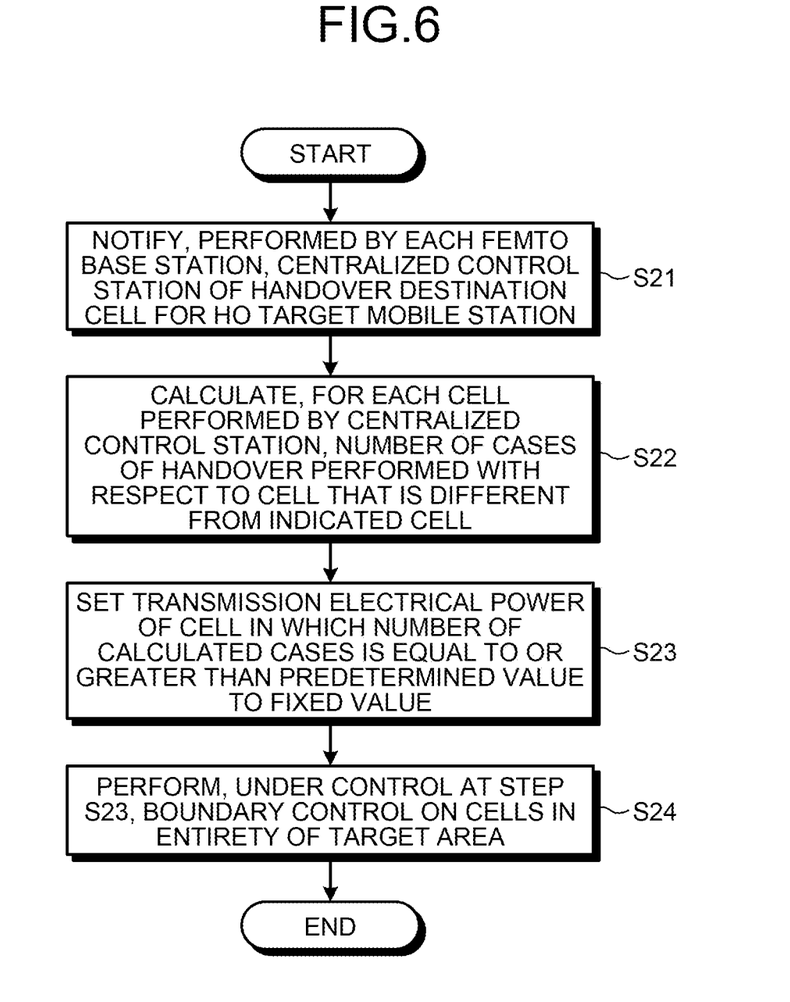
FIG. 6 is a flowchart illustrating the flow of a cell boundary control method adjusting process.

In the following, a description will be given of a process, with reference to FIG. 6 and FIG. 7, of adjusting, after a handover is performed, the cell boundary control method in accordance with the probability of implementing a handover to the indicated handover destination cell. FIG. 6 is a flowchart illustrating the flow of a cell boundary control method adjusting process. First, at Step S21, the HO destination notifying unit 17 in the femto base station 10 notifies the centralized control station of the actual handover destination cell for the HO target mobile station. Then, the centralized control station that has been received the notification calculates, for each cell, the number of occurrences of the cases of a handover performed with respect to the cell that is different from the cell indicated as the handover destination (Step S22). Furthermore, the number of the cases to be calculated is, for example, the number of cases per predetermined time, the number of cases (rate) per number of mobile stations, or the combination of these cases.

At Step S23, the centralized control station sets the transmission power of the cell in which the number of cases calculated at Step S22 is equal to or greater than the predetermined value to the fixed value. For example, if the number of cases of the handover performed from the cell C10 that is formed by the femto base station 10 to the cell other than the HO destination indication cell C20 (including a case in which a handover is not performed) is equal to or greater than the predetermined value, the centralized control station instructs the femto base station 10 to set the transmission power of the femto base station 10 to the fixed value.

Furthermore, under the constraint condition indicating that the transmission power of the cell in which the number of cases calculated at Step S22 is equal to or greater than the predetermined value is set to the fixed transmission power, the centralized control station performs the cell boundary control process described above (see FIG. 3) on the cell (a femto cell with the fixed transmission power and a femto cell with the variable transmission power) in the entirety of the target area (Step S24). For example, if the number of cases of the handover from the cell C10 formed by the femto base station 10 to the cell that is other than the HO destination indication cell C20 (including the case in which a handover is not performed) is less than the predetermined value, the centralized control station instructs the femto base station 10 to set the transmission power of the femto base station 10 to a variable value.

Figure 7:
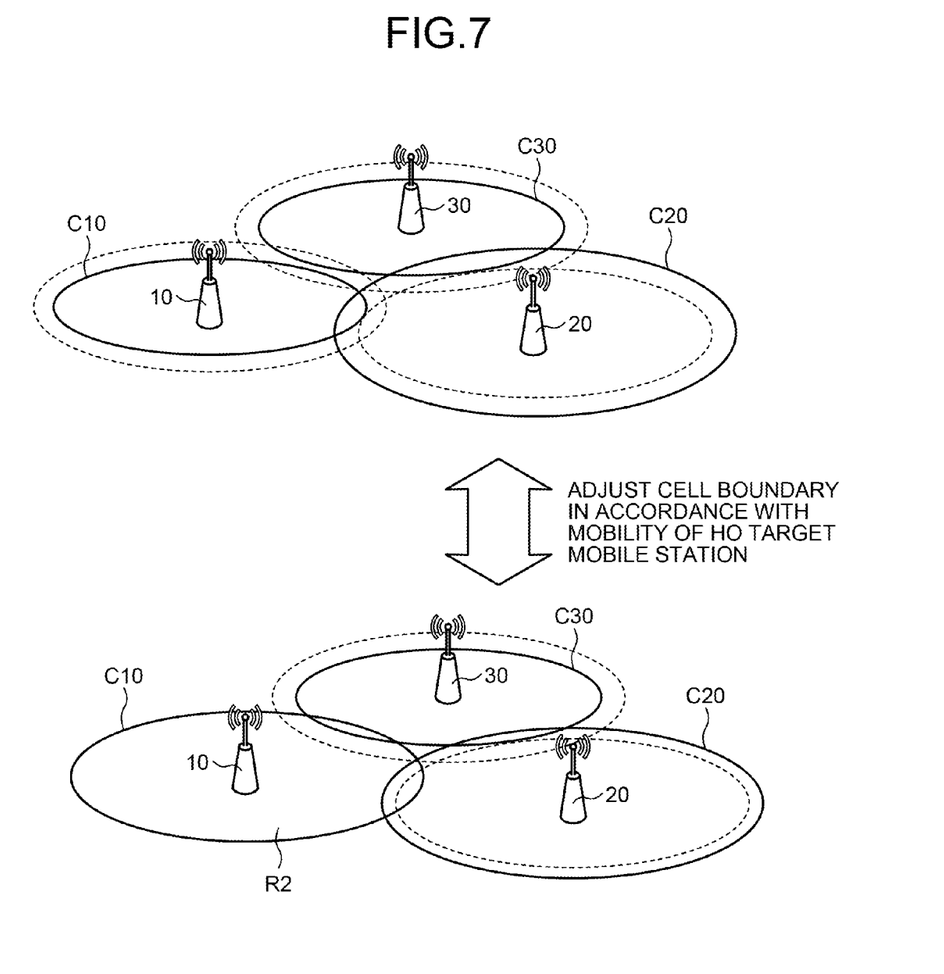
FIG. 7 is a schematic diagram illustrating a state in which a boundary control method used in the cell is adjusted in accordance with the mobility of an HO target mobile station.

FIG. 7 is a schematic diagram illustrating a state in which a boundary control method used in the cell C10 is adjusted in accordance with the mobility of an HO target mobile station. As illustrated in FIG. 7, in the cells C10, C20, and C30 in which the mobility of the HO target mobile station is low, the transmission power value is controlled in a variable manner; however, if the mobility of the cell C10 is increased, similarly to an area R2, the centralized control station fixes the transmission power value of the femto base station 10 in response to an instruction received from the femto base station 10. In other words, because the cells C20 and C30 in each of which the terminal mobility is low can be optimized in accordance with the user distribution, the cells C20 and C30 are targeted for the boundary control. In contrast, because the cell C10 in which the terminal mobility is high is hard to be optimized in accordance with the user distribution, the cell C10 is out of the target for the boundary control.

If the forced handover is not performed, as described above, the handover destination cell is determined based on the communication status of the HO target mobile station. Consequently, if the number of the HO target mobile stations is great, the number of the mobile stations that are not handed over to the cell, for example, the HO destination indication cell C20, indicated by the centralized control station. Accordingly, each of the femto base stations 10, 20, and 30 notifies the centralized control station of the cell to which the HO target mobile station was actually handed over. The centralized control station counts, for each cell, the number of cases in each of which the handover destination cell that is actually notified is different from the handover destination cell that is indicated by the centralized control station itself (corresponding to the conditions (1) and (2) described above). The centralized control station estimates, based on the number of cases, the average mobility of the HO target mobile station in each of the cells C10, C20, and C30. Namely, because a handover that does not conform to the instruction received from the centralized control station is performed in the cell in which a greater number of the above described cases is present, the centralized control station can estimate that the mobility of the HO target mobile station is high. In contrast, because a handover that conforms to the instruction received from the centralized control station is performed in the cell in which a smaller number of the above described cases is present, the centralized control station can estimate that the percentage of the mobility of HO target mobile station is low.

Accordingly, the centralized control station adjusts a method of optimizing the cell boundary control in accordance with the mobility of the HO target mobile station in each of the cells C10, C20, and C30. Namely, if the period of the cell boundary control is long, in a cell that accommodates the greater number of the HO target mobile stations whose mobility is high, when the femto base station attempts to instantaneously follow a change in the user distribution, there is a possibility that the femto base station is not able to follow the change because the communication status of the HO target mobile station is greatly changed. Consequently, a mismatch occurs between the transmission power of the femto base station and the optimum transmission power for the current distribution of the connected mobile stations, which conceivably degrades the communication quality. Accordingly, a femto base station in a cell in which the mobility is high sets a fixed transmission power value without following the change. Thus, the cell in which the mobility is high is excluded from the target for the optimization of the cell boundary control and thus the degradation of the communication quality can be avoided.

An example of the fixed transmission power value that can be used in this case includes the average value of a past transmission power (for example, 5 to 10 mW), the maximum value (for example, 20 mW), and the maximum transmission power value (for example, 30 mW).

As described above, the femto base station 10 includes the measurement information collecting unit 12, the HO destination cell deciding unit 14, and the HO control unit 15. The measurement information collecting unit 12 acquires the measurement information on the wireless communication quality related to the mobile station U1. The HO destination cell deciding unit 14 decides a cell to which the mobile station U1 is handed over by using the measurement information related to the downlink direction acquired by the measurement information collecting unit 12 and by using the information, i.e., the threshold α, that is used to control the priority of the handover destination cell C20 that is indicated by the centralized control station. The HO control unit 15 hands over the mobile station U1 to the cell that is decided by the HO destination cell deciding unit 14 from among the cells C10, C20, and C30. The measurement information mentioned above includes, for example, the measurement information related to the handover source cell C10 for the mobile station U1, the measurement information related to the handover destination cell C20, and the measurement information related to the cell C30 in which the wireless communication quality is the most appropriate from among the cells other than the handover source cell and the handover destination cell described above.

Namely, in a related technology, there is no mechanism for both handling a handover instruction given from the centralized control station and handling the communication status of the HO target mobile station; therefore, the femto base station 10 according to the embodiment performs a handover in which a handover source cell is used as the start of the process. Specifically, the femto base station 10 instructs the HO target mobile station to report the latest (immediately before a handover) measurement information and then decides a handover destination cell for the HO target mobile station by using the handover destination cell information, such as the cell ID of the cell to be handed over, indicated by the centralized control station and by using the measurement information described above. Consequently, the femto base station 10 determines whether the handover destination indicated by the centralized control station is suitable by taking into consideration the communication status of the HO target mobile station. Accordingly, the femto base station 10 can prevent an inappropriate handover that possibly causes the degradation of the property due to the mobility of the HO target mobile stations. Consequently, a decrease in the quality of communication between the base station and the mobile station can be suppressed.

In the embodiment described above, a smart phone is described as the mobile station; however, the present invention is not limited to the smart phone but may be applied in various communication devices, such as a mobile phone, a personal digital assistant (PDA), or the like, in which the wireless communication quality can be measured. Furthermore, a value that can be used for the measurement information is not limited to the RSRP. For example, a received signal strength indication (RSSI) value that indicates the radio wave intensity, a signal to interference and noise ratio (SINR) value, a reference signal received quality (RSRQ) value may also be used. Alternatively, channel state information (CSI), such as the signal to interference ratio (SIR), the channel quality indicator (CQI), the precoding matrix indicator (PMI), the rank indicator (RI), the layer indicator (LI), or the like may also be used.

Furthermore, each of the components in the femto base station 10 is not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the threshold α retaining unit 13 and the threshold α adjusting unit 16, or the HO control unit 15 and the HO destination notifying unit 17 may also be integrated as a single unit. In contrast, the threshold α adjusting unit 16 may also be separated by dividing it into a unit that controls an increase or a decrease in the threshold α and into a unit that determines whether the property has been improved. Furthermore, the transmission power control unit 11 may also be separated by dividing it into a unit that changes its transmission power to an optimum value that is notified by the centralized control station (Step S4 illustrated in FIG. 3) and into a unit that fixes or varies its transmission power (Steps S23 and S24 illustrated in FIG. 6) in accordance with whether the number of handovers to the cell other than the HO destination indication cell C20 (including a case in which a handover is not performed) is equal to or greater than a predetermined value. Furthermore, a memory that stores therein the measurement information or the threshold α may also be used as an external device of the femto base station 10 and be connected via a network or by a cable.

According to an aspect of an embodiment of the base station disclosed in the present invention, an advantage is provided in that a decrease in the communication quality can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a processor configured to execute a process including:
acquiring measurement information related to wireless communication quality of a mobile station;
deciding, by using the measurement information acquired at the acquiring and information that is used to control priority of a handover destination cell indicated by a control station, a cell to which the mobile station is handed over; and
controlling to hand over the mobile station to the cell decided at the deciding, wherein
the control station determines the handover destination cell for the mobile station based on the measurement information, calculates, for each cell, a number of occurrences of cases of a handover performed with respect to the cell that is different from the cell indicated as the handover destination cell, and appropriately changes an operation of the control station in accordance with the calculation result.

2. The base station according to claim 1, wherein the deciding includes deciding the cell to which the mobile station is handed over by using the measurement information related to a handover source cell for the mobile station, the measurement information related to the handover destination cell, the measurement information related to a cell in which the wireless communication quality is most favorable from among cells other than the handover source cell and the handover destination cell, and the information that is used to control the priority.

3. The base station according to claim 1, wherein the process further includes changing, in accordance with mobility of the mobile station, the information that is used to control the priority.

4. The base station according to claim 1, wherein the process further includes notifying the control station of the cell to which the mobile station was handed over at the controlling.

5. A base station control method comprising:
- acquiring, performed by a base station, measurement information related to wireless communication quality of a mobile station, using a processor;
- deciding, performed by the base station, a cell to which the mobile station is handed over by using the acquired measurement information and information that is used to control priority of a handover destination cell indicated by a control station, using the processor; and
- handing over, performed by the base station, the mobile station to the decided cell, using the processor, wherein
- the control station determines the handover destination cell for the mobile station based on the measurement information, calculates, for each cell, a number of occurrences of cases of a handover performed with respect to the cell that is different from the cell indicated as the handover destination cell, and appropriately changes an operation of the control station in accordance with the calculation result.

* * * * *